Patented Aug. 21, 1928.

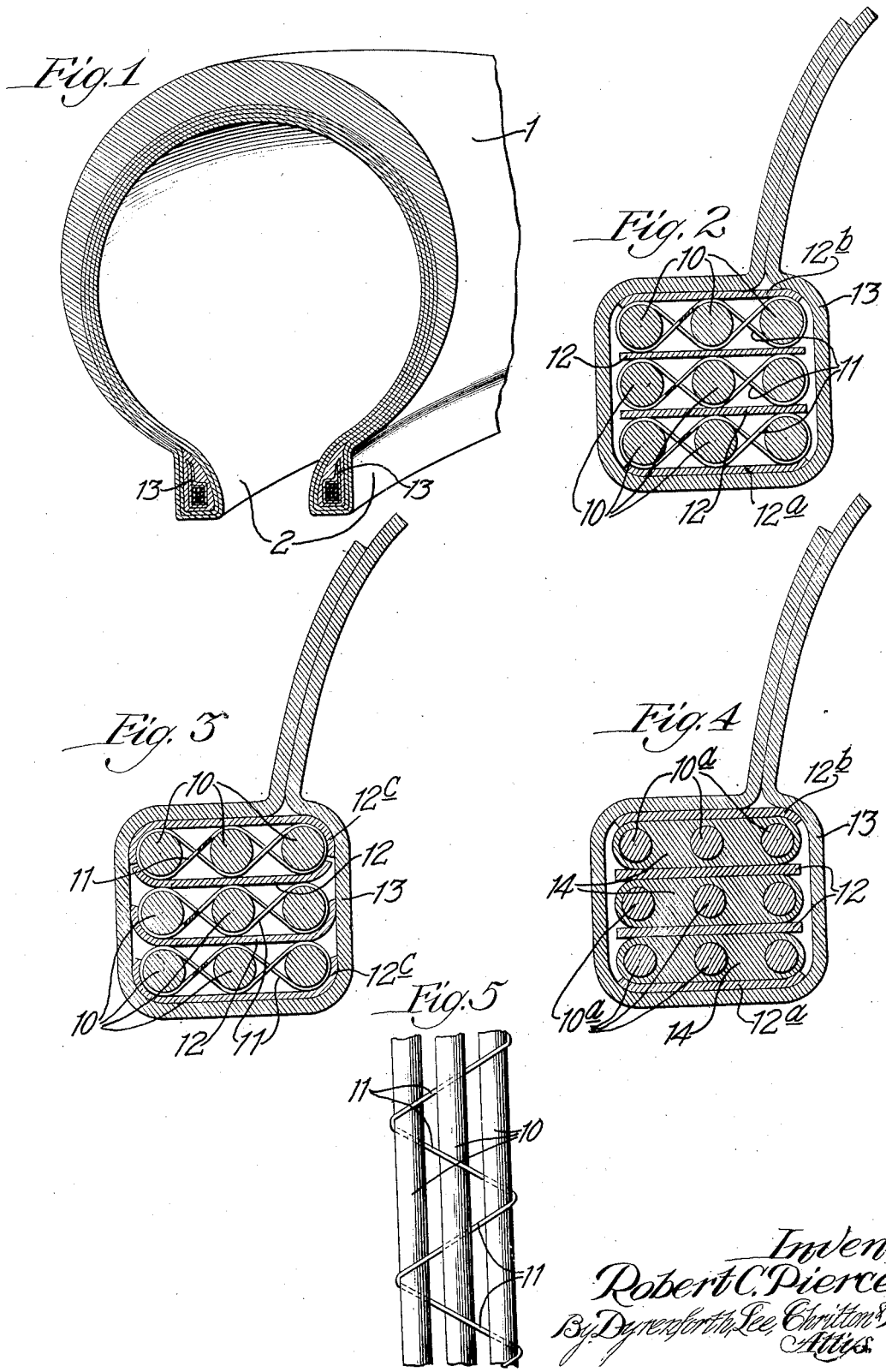

1,681,680

UNITED STATES PATENT OFFICE.

ROBERT C. PIERCE, OF NILES, MICHIGAN, ASSIGNOR TO NATIONAL-STANDARD COMPANY, OF NILES, MICHIGAN, A CORPORATION OF MICHIGAN.

BEAD FOR PNEUMATIC TIRES.

Application filed June 18, 1927. Serial No. 199,808.

This invention relates to improvements in beads for pneumatic tires.

Among the features of my invention is the provision of a tire bead provided with a reinforcement which may be easily and cheaply manufactured and which is substantially non-stretchable.

Other features and advantages of my invention will appear more fully as I proceed with my specification.

In that form of device embodying the features of my invention shown in the accompanying drawings, Fig. 1 is a sectional perspective view of a tire, Fig. 2 is a vertical sectional view on an enlarged scale showing the reinforcement for the bead, Fig. 3 is a view similar to Fig. 2 showing a modified form and Fig. 4 is another similar view showing another modified form, Fig. 5 is a top plan view of a portion of the reinforcing element used in making the bead.

As shown in the drawings, 1 indicates a conventional tire casing provided with the usual bead 2, which is formed of a suitable rubber composition, the bead being of a cross-section corresponding to the tire in which it is desired to use the same.

I shall now describe the reinforcement forming a part of the bead. In order to make the reinforcement for the bead I take any suitable reinforcing element or tape, having sufficient tensile strength. For example, the reinforcing element used may consist of three parallel wires or tension members 10 held in parallel relation by the thinner strand 11 woven diagonally back and forth as shown. Such an element, consisting of the three wires 10 bonded or held together by the wire 11, or any other suitable element may be used. In the use of such an element, the same is convolutely disposed in the tire bead, as many turns as desired being formed. In making my bead, for example, there may be three wraps or convolutions of the element as shown in the drawings. If desired, these wraps may be made on the mandrel or form as the bead is being made up, or the element may be so disposed apart from the bead and formed into a completed annulus which is inserted in the bead as the same is formed. In either case, however, as the convolutions of the element are formed, a strip or strips of impregnated fabric or fibrous ribbon as indicated by 12 are placed between adjacent surfaces of the reinforcing element and a similar strip 12$^a$ is placed inside of the inner wrap and another 12$^b$ outside of the outer wrap, such fibrous strips being also convolutely disposed in the tire bead, and this ribbon or strip 12 and the element 10 being substantially parallel throughout their lengths. This fabric or fibrous ribbon, tape, or other material, is preferably impregnated with rubber compound similar to the rubber compound used in the manufacture of the completed bead, so that as the bead is formed, in the curing process, the reinforcing element, and the various convolutions thereof, become firmly united together, and embedded in the tire bead. The annulus thus formed of the turns of the reinforcing element with the strips 12, 12$^a$ and 12$^b$ is preferably incased in a strip of material 13, commonly known as a flipper strip, which becomes a part of the bead in the final forming process.

The form shown in Fig. 3 is substantially the same as that shown in Fig. 2 except that the impregnated fabric or fibrous ribbons or strips 12, 12$^a$ and 12$^b$ are made somewhat wider than the element 10 so that they have overlapping edges as indicated by 12$^c$ which curve around the edges of the outer wires 10 of the reinforcing element, thus more completely enclosing the convolutions of the element in the impregnated fabric or fibrous ribbon.

In the form shown in Fig. 4, I have used a reinforcing element consisting of the wires 10$^a$, which are not held together by a bonding wire 11 but which are held together by being embedded in a rubber compound 14. That is, in the form shown in Fig. 4, the reinforcing element is a sort of tape or band consisting of the three wires 10$^a$ embedded in a rubber compound 14. This reinforcing element is convolutely disposed to form an annulus (three wraps being shown) in the same manner as the element shown in Figs. 2 and 3, and there is laid between the turns of this element a similar rubber impregnated fabric or fibrous ribbon 12. A similar ribbon 12$^a$ is laid under the bottom layer and another 12$^b$ on the top layer of the element.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. A tire bead having embedded therein a convolutely disposed reinforcing element, the wraps of said element being separated by a convolutely disposed fibrous ribbon impregnated with rubber, the ribbon and the element being parallel substantially throughout their lengths.

2. A tire bead having embedded therein a convolutely disposed reinforcing element, the wraps of said element being separated by a convolutely disposed fibrous ribbon impregnated with rubber, the ribbon and the element being parallel substantially throughout their lengths, and the whole being incased in a flipper strip.

3. A tire bead having embedded therein a convolutely disposed reinforcing element the wraps of said element being separated by a convolutely disposed fibrous ribbon impregnated with rubber, the ribbon and the element being parallel substantially throughout their lengths, and a similar rubber impregnated fibrous ribbon lying inside the inner wrap and outside the outer wrap.

4. A tire bead having embedded therein a convolutely disposed reinforcing element, the wraps of said element being separated by a convolutely disposed fibrous ribbon impregnated with rubber, the ribbon and the element being parallel substantially throughout their lengths and a similar rubber impregnated fibrous ribbon lying inside the inner wrap and outside the outer wrap, the whole being incased in a flipper strip.

5. A tire bead having embedded therein a convolutely disposed reinforcing element, a fibrous ribbon impregnated with rubber lying between the wraps of said element, and a similar fibrous ribbon impregnated with rubber lying inside the inner wrap and outside the outer wrap, said ribbons being wider than said element whereby the edges thereof are bent around the edges of the element when the same is incased in a flipper strip.

In witness whereof, I have hereunto set my hand this 15th day of June, 1927.

ROBERT C. PIERCE.